(12) United States Patent
Dupree et al.

(10) Patent No.: US 7,484,273 B1
(45) Date of Patent: Feb. 3, 2009

(54) COUPLING DEVICE

(76) Inventors: Andrea Dianne Dupree, 3055 NW. 61st St., Seattle, WA (US) 98107; Kieron Barbra Grey, 3055 NW. 61st St., Seattle, WA (US) 98107

( * ) Notice: Subject to any disclaimer, the term of this patent is extended or adjusted under 35 U.S.C. 154(b) by 0 days.

(21) Appl. No.: 10/733,827

(22) Filed: Dec. 11, 2003

Related U.S. Application Data (60) Provisional application No. 60/319,770, filed on Dec. 11, 2002.

(51) Int. Cl.
 *A45F 5/00* (2006.01)
(52) U.S. Cl. ............................. 24/3.13; 24/3.2
(58) Field of Classification Search .............. 294/74, 294/137, 149, 150, 152, 158, 159, 168, 170; 224/197, 250, 218–222, 677, 904; 24/3.1, 24/3.13, 30.5 R, 298, 300–302
See application file for complete search history.

(56) References Cited

U.S. PATENT DOCUMENTS

| | | | | |
|---|---|---|---|---|
| 4,982,522 A * | 1/1991 | Norton | ........................ | 224/220 |
| 5,082,156 A * | 1/1992 | Braun | ........................ | 224/220 |
| 5,234,245 A * | 8/1993 | Peterson et al. | ............. | 294/158 |
| 5,353,538 A * | 10/1994 | Hakedal et al. | ............. | 224/150 |
| D377,862 S * | 2/1997 | Moore | ........................ | 224/220 |
| 6,216,319 B1 * | 4/2001 | Elkins | ........................ | 24/3.2 |
| 6,447,037 B1 * | 9/2002 | Crouch | ....................... | 294/149 |
| 6,641,011 B1 * | 11/2003 | Kahn | ........................ | 224/269 |
| D488,924 S * | 4/2004 | Miller | ........................ | D3/228 |
| 6,843,393 B2 * | 1/2005 | Sinclair | ..................... | 224/150 |
| 2003/0173382 A1 * | 9/2003 | Robinson | .................... | 224/259 |

* cited by examiner

*Primary Examiner*—Robert J Sandy
*Assistant Examiner*—Ruth C Rodriguez
(74) *Attorney, Agent, or Firm*—Christensen O'Connor Johnson Kindness PLLC (57) ABSTRACT

The exemplary embodiments of the coupling device described and illustrated herein are suitable for use as a secondary or redundant system for retaining attachment between a user's arm and a closed handled device in the event the user looses her grip of the device handle. Each of the coupling devices include a body constructed from a pliable material, such as leather, nylon, poly or cotton webbing, etc. Formed at the ends of the body are first and second loops and that define first and second openings, respectively. The first opening is sized and configured such that the second loop may be routed therethrough. The second opening is sized to slide over the hand and wrist of a user.

10 Claims, 11 Drawing Sheets

COUPLING DEVICE

CROSS-REFERENCE(S) TO RELATED APPLICATION(S)

This application claims the benefit of U.S. Provisional Application No. 60/319,770, filed Dec. 11, 2002, which is hereby incorporated by reference.

FIELD OF THE INVENTION

The present invention is directed to coupling devices, and in particular, to coupling devices that provide secondary or redundant attachment between a hand of a user and a closed handled device, such as a retractable dog leash, briefcase, luggage, etc.

BACKGROUND OF THE INVENTION

Currently, there are many products commercially available to assist people in walking their dogs. One such product is a retractable dog leash. The retractable dog leash typically includes a rounded box-like housing defining a closed handle at one end. The housing retains a length of strap that is stored in a coiled configuration around a reel located within the housing, and is retractable to and from the housing through a port. The retractable dog leash further includes a retraction mechanism for selectively retracting the strap into the housing. The retracting mechanism can be, for example, a conventional torsion spring mechanism attached to the center of the reel in the interior of the housing that automatically retracts the strap inside the housing. The strap ends in a fastening mechanism, such as a clip, that engages with a ring or the like on the dog's collar.

While these retractable dog leashes perform well for its given task, they sometimes create other problems for the user. For example, the closed handle is awkward to grasp, resulting in the user either loosing control of or dropping the leash. This is especially evident when the retractable dog leash is used to walk larger dogs, which can pull or yank the handle away from the grasp of the user. Once the user's grasp of the handle is gone, the dog may be free to run off, etc.

Therefore, there is a need for a coupling device that assists a user hand in maintaining attachment to a closed handled device, such as the retractable dog leash, in the event the user looses her grasp of the handle.

SUMMARY OF THE INVENTION

In accordance with aspects of the present invention, a coupling device is provided. The coupling device includes a device body constructed of a pliant material. The body includes a first end and a second end. The first end includes a first loop defining a first opening and the second end includes a second loop defining a second opening.

In accordance with another aspect of the present invention, a method of making a coupling device is provided. The method includes obtaining a strip of pliant material having first and second ends, forming a first loop at the first end of the strip, and forming a second loop at the second end of the strip.

In accordance with still another aspect of the present invention, a method of using a coupling device for providing redundant attachment between an arm of a user and a device having a closed handle is provided. The method includes obtaining a coupling device having first and second ends. The first end includes a first loop defining a first opening and the second end includes a second loop defining a second opening. The first loop is routed through the closed handle, and the second loop is inserted through the first opening. The second loop is then pulled through the first opening to tighten the coupling device to the closed handled device.

BRIEF DESCRIPTION OF THE DRAWINGS

The foregoing aspects and many of the attendant advantages of the invention will become more readily appreciated by reference to the following detailed description, when taken in conjunction with the accompanying drawings, wherein.

DETAILED DESCRIPTION OF THE PREFERRED EMBODIMENTS

Figure 1:
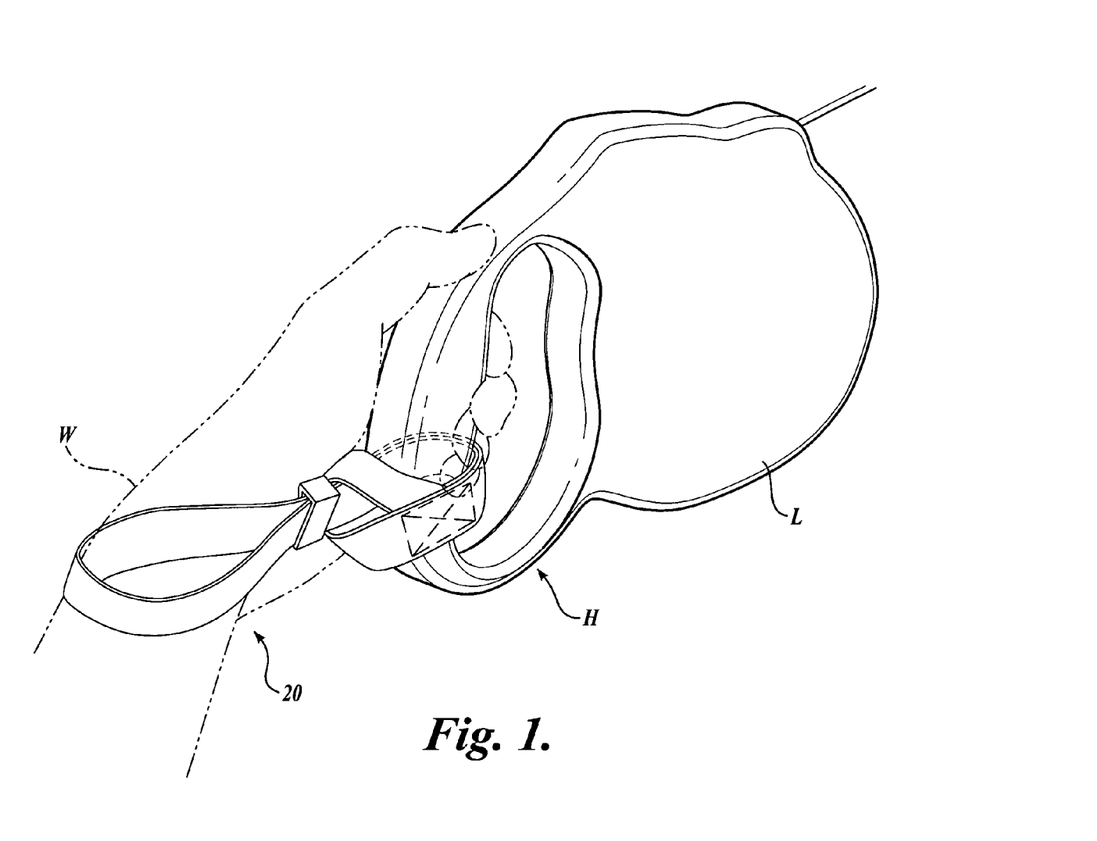
FIG. 1 is a perspective view of a coupling device constructed in accordance with aspects of the present invention for providing a secondary or redundant attachment system between a user's hand and the closed handle of a device.

The present invention will now be described with reference to the accompanying drawings where like numerals correspond to like elements. One suitable embodiment of a coupling device, generally designated 20, constructed in accordance with the present invention is illustrated in FIGS. 1-7. As best shown in FIG. 1, the coupling device 20 is suitable for use as a secondary or redundant system for maintaining attachment between a user's wrist and a closed handled device in the event the user looses her grip of the device handle. In use, the coupling device 20 is secured around a closed handle H of a device L and attached to the wrist W of the user so that in the event the user looses her grasp of the handle H, the device L is still attached to the user's wrist W.

Figure 7:
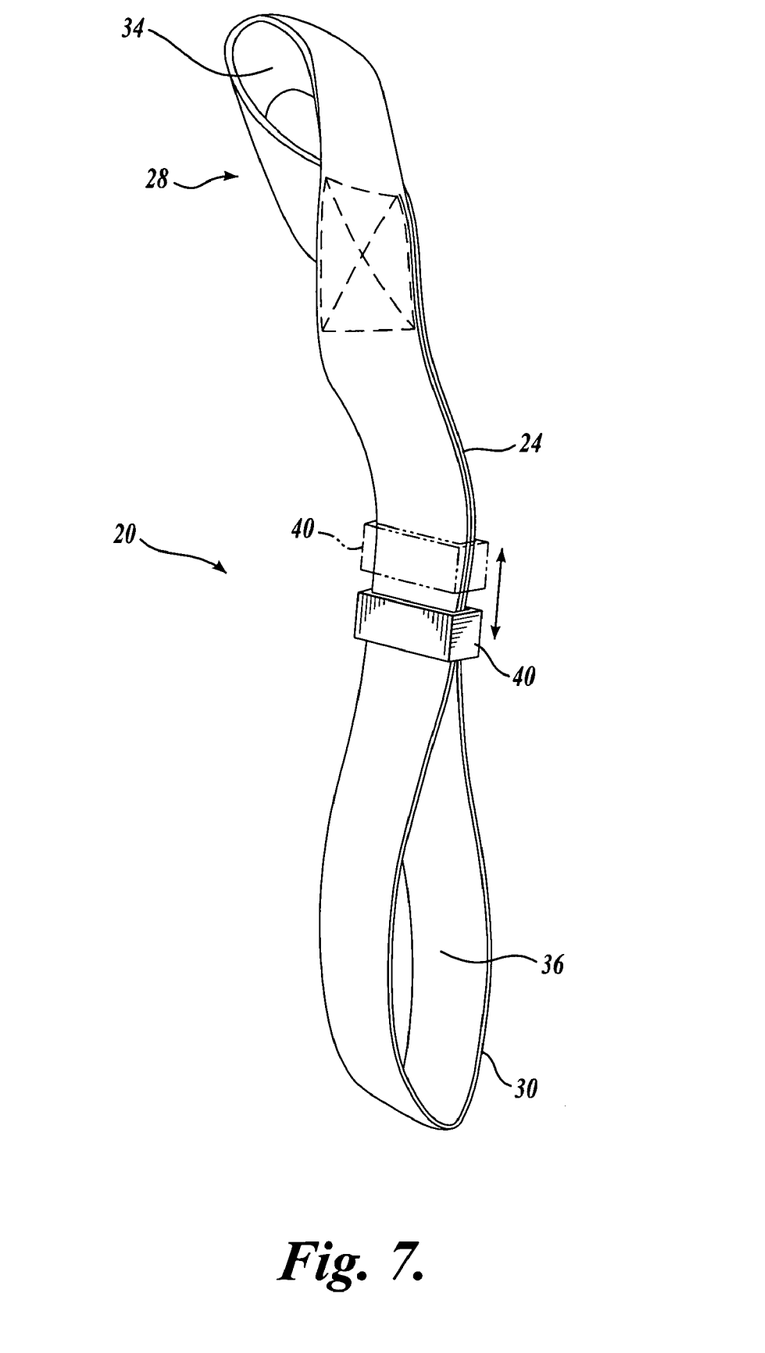

Referring now to FIG. 7, there is shown a perspective view of one exemplary embodiment of the coupling device 20. The coupling device 20 includes a body 24 constructed from a pliable material, such as leather, nylon, poly or cotton webbing, etc. Formed at the ends of the body 24 are first and second loops 28 and 30 that define first and second openings 34 and 36, respectively. The first opening 34 is sized and configured such that the second loop 30 may be routed therethrough, and is preferably sized smaller than the second opening 36. The second opening 36 is sized to slide over the hand and wrist of a user. When opened, the central axis of the first opening 34 is non-parallel with the central axis of the second opening 36. Preferably, the openings 34 and 36 are oriented such that the amount of body twisting is minimized during use.

The coupling device 20 may further include a collar 40 that functions to adjust the size of the second opening 36. The collar 40 is slidably movable over the second loop 30 in a friction engaging manner. The collar 40 is preferably constructed of plastic or other rigid or semi-rigid materials. In operation, once the second loop 30 is slipped over the wrist of the user, the collar 40 may be moved in a sliding fashion toward the wrist (i.e.; in the direction of the hand) until the size of the second opening 36 has decreased enough where the coupling device 20 is prevented from slipping off the wrist of the user.

Figure 2:
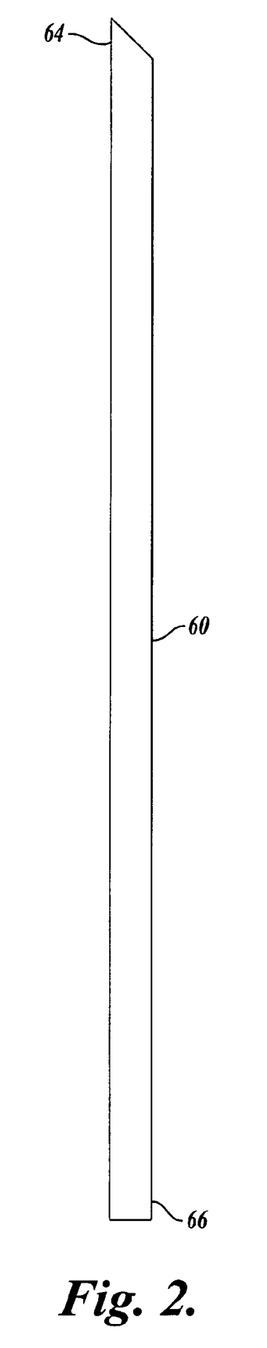
FIGS. 2-7 depict the sequential steps of one exemplary method of making the coupling device of FIG. 1.

One method of constructing the coupling device 20 will now be described in detail with reference to FIGS. 2-7. As best shown in FIG. 2, the coupling device 20 begins as an elongated rectangular strip 60 of any suitable material discussed above, such as nylon, leather, etc. of sufficient dimensions, for example, approximately 22 inches by approximately 1 inch by 1/16 inch, although these dimensions may vary depending upon the application of the coupling device. Preferably, one end 64 of the strip 60 is cut or otherwise formed at an angle of approximately 40-45 degrees, while the opposite end 66 is straight and square. Next, the angled end 64 is bent down, twisted slightly, and placed in front of the remaining portion of the strip 60 into the position shown in FIGS. 3 and 4, thereby forming the first loop 28. The angled end 64 is preferably aligned such that the edge of the angled end 64 is substantially flush and parallel with the edge of the remaining portion of the strip 60.

Figure 3:
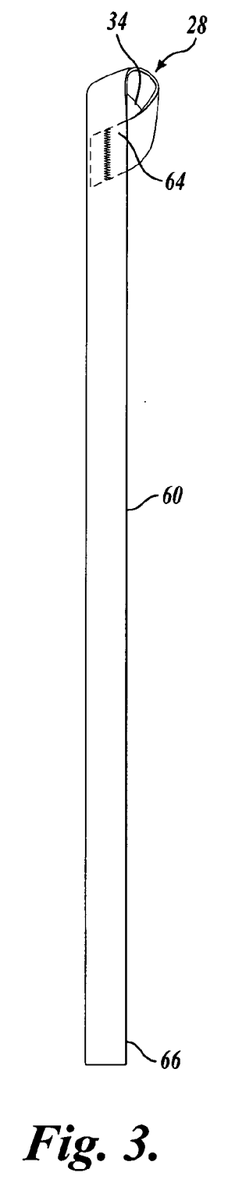
Figure 4:
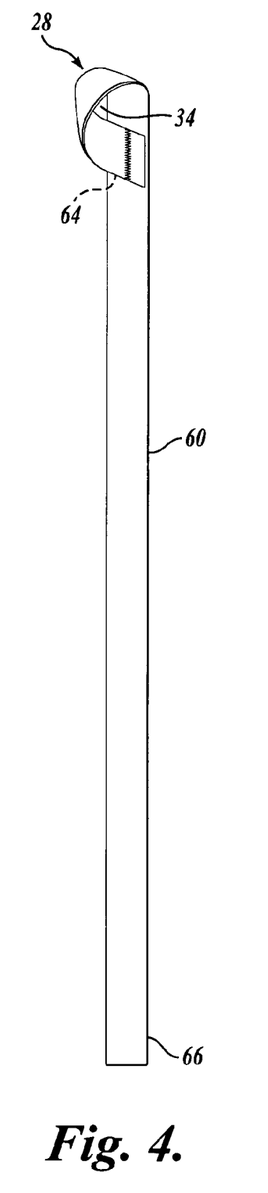

Once the angled end 64 is in the position shown in FIGS. 3 and 4, the angled end 64 is stitched, glue bonded, or otherwise secured to the remaining portion of the strip 60. It will be appreciated that the location (i.e.; the distance from the angle end) of the connection determines the size of the first opening 34. As such, the angled end 64 should be attached at a location along the strip 60 such that the first opening 34 formed by the first loop 28 is sufficiently sized to receive the second loop 30 therethrough. In one embodiment, the connection is approximately 5-7 inches or approximately 20-35% of the length of the strip 60 from the edge of the end 64. Of course, these dimensions and ratios may change depending on the width of the strip 60 being used.

Figure 5:
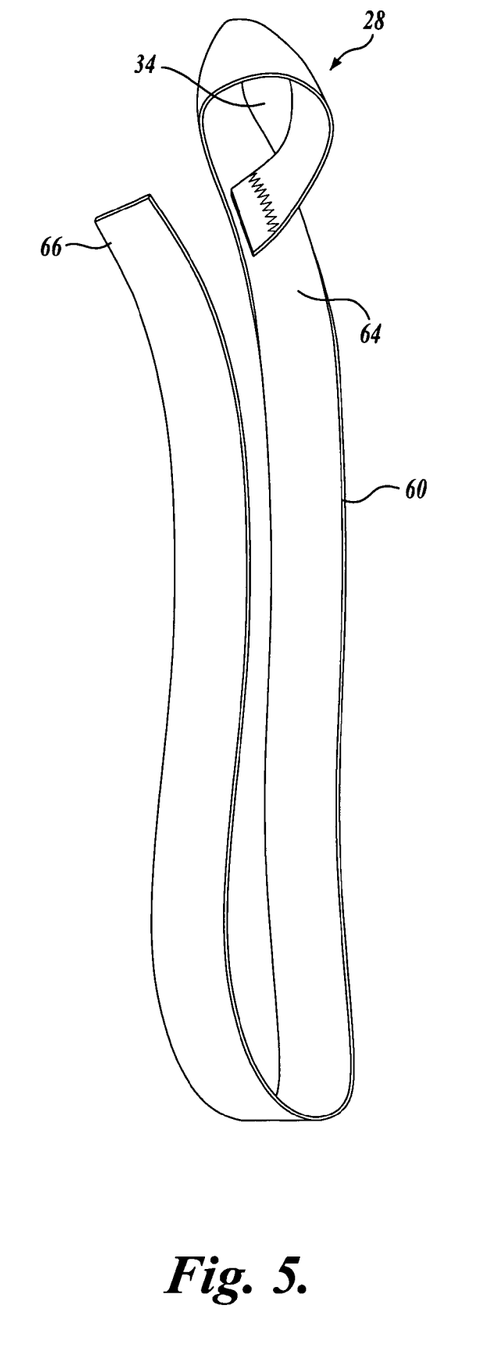
Figure 6:
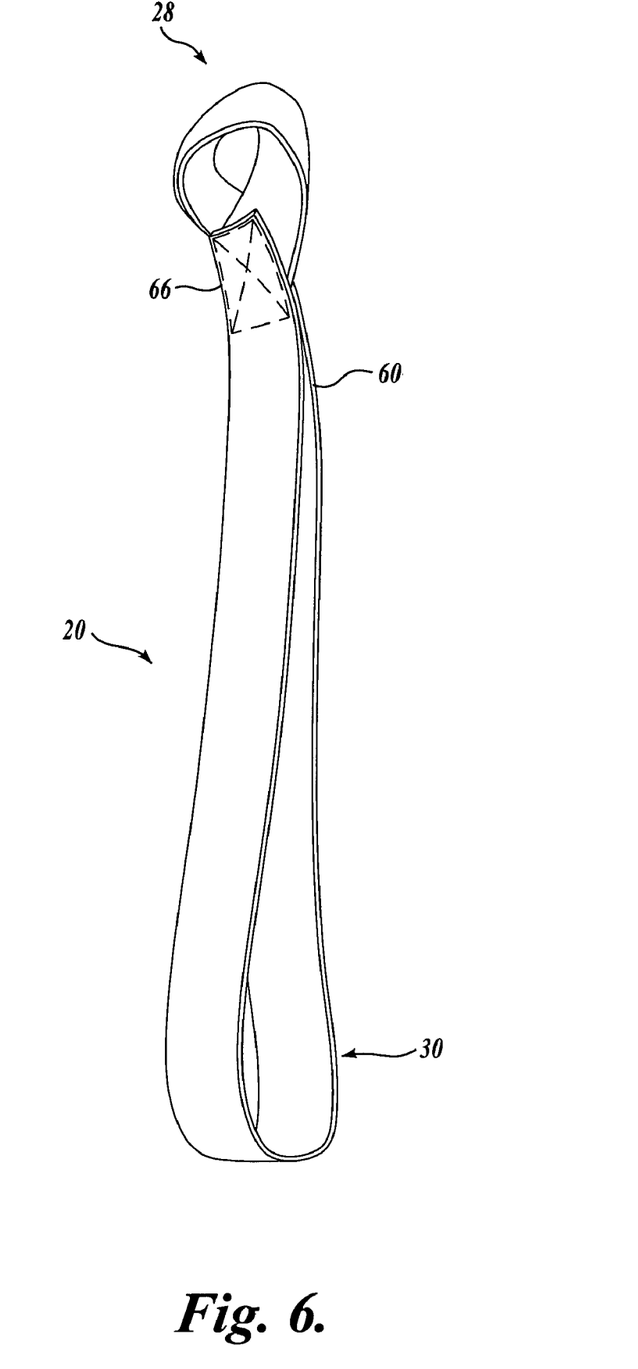

Once the first loop 28 has been formed, the squared end 66 is bent toward the first loop 28, as shown in FIG. 5, until the squared end covers the angled end 64, as best shown in FIG. 6. Once the squared end 66 is in the position shown in FIG. 6, the squared end 66 is stitched, glue bonded, or otherwise secured to the strip 60, thereby forming the second loop 30. Once the second loop 30 has been formed, the optional size adjustment collar 40 may then be slid over the closed end of the second loop 30 to a position shown in FIG. 7.

Figure 8:
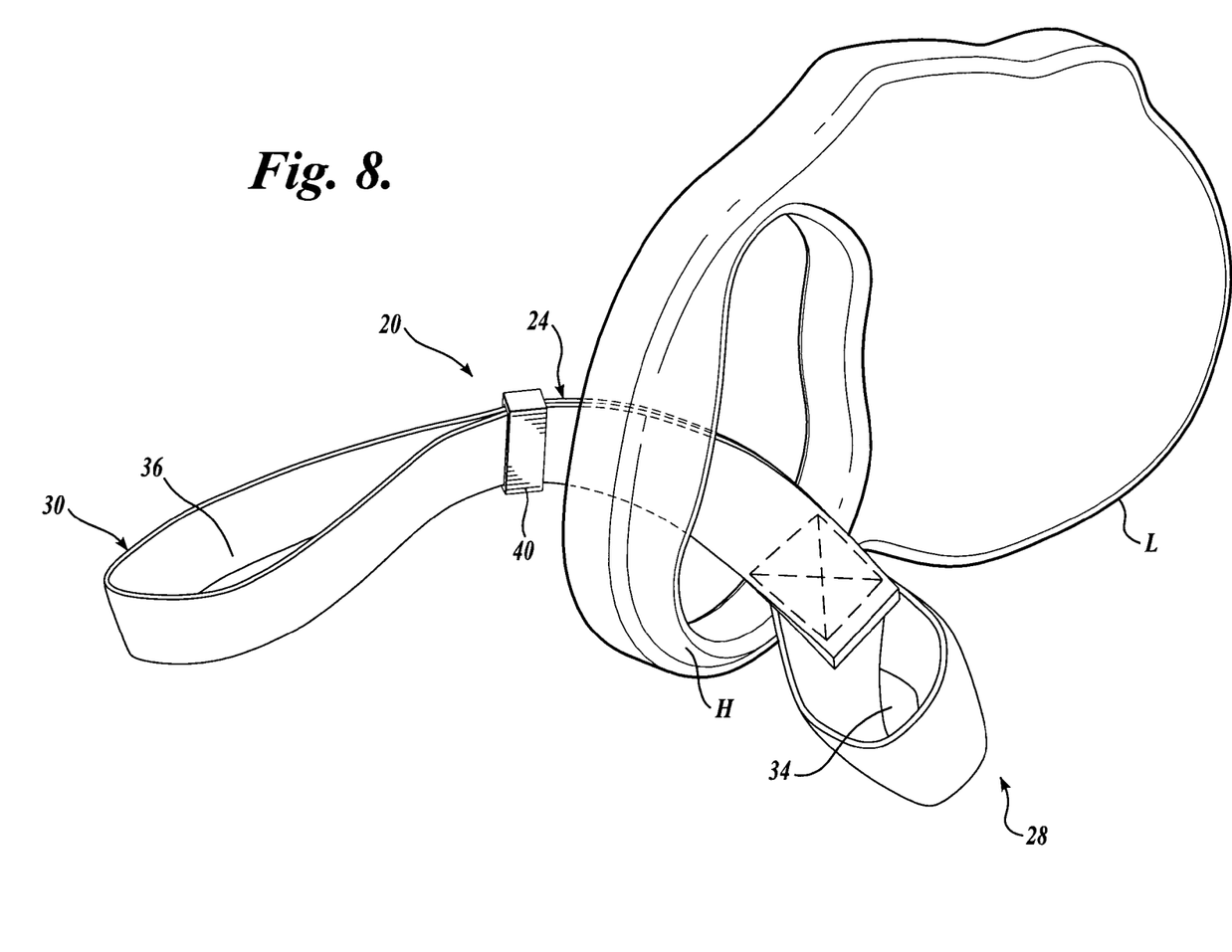
FIGS. 8-10 depict the sequential steps of using the coupling device of FIG. 1 for providing a secondary or redundant attachment system between a user's hand and the closed handle of a device.
Figure 9:
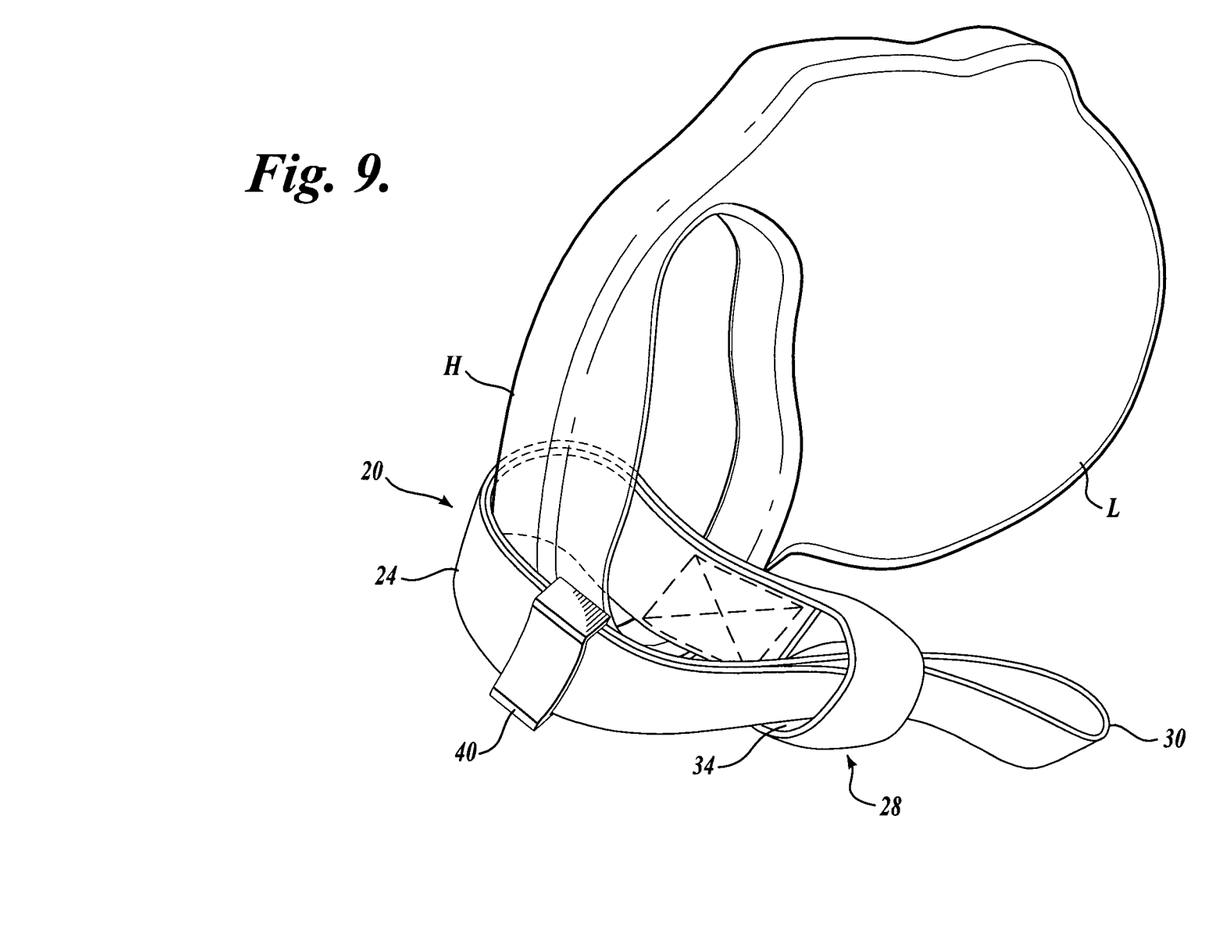
Figure 10:
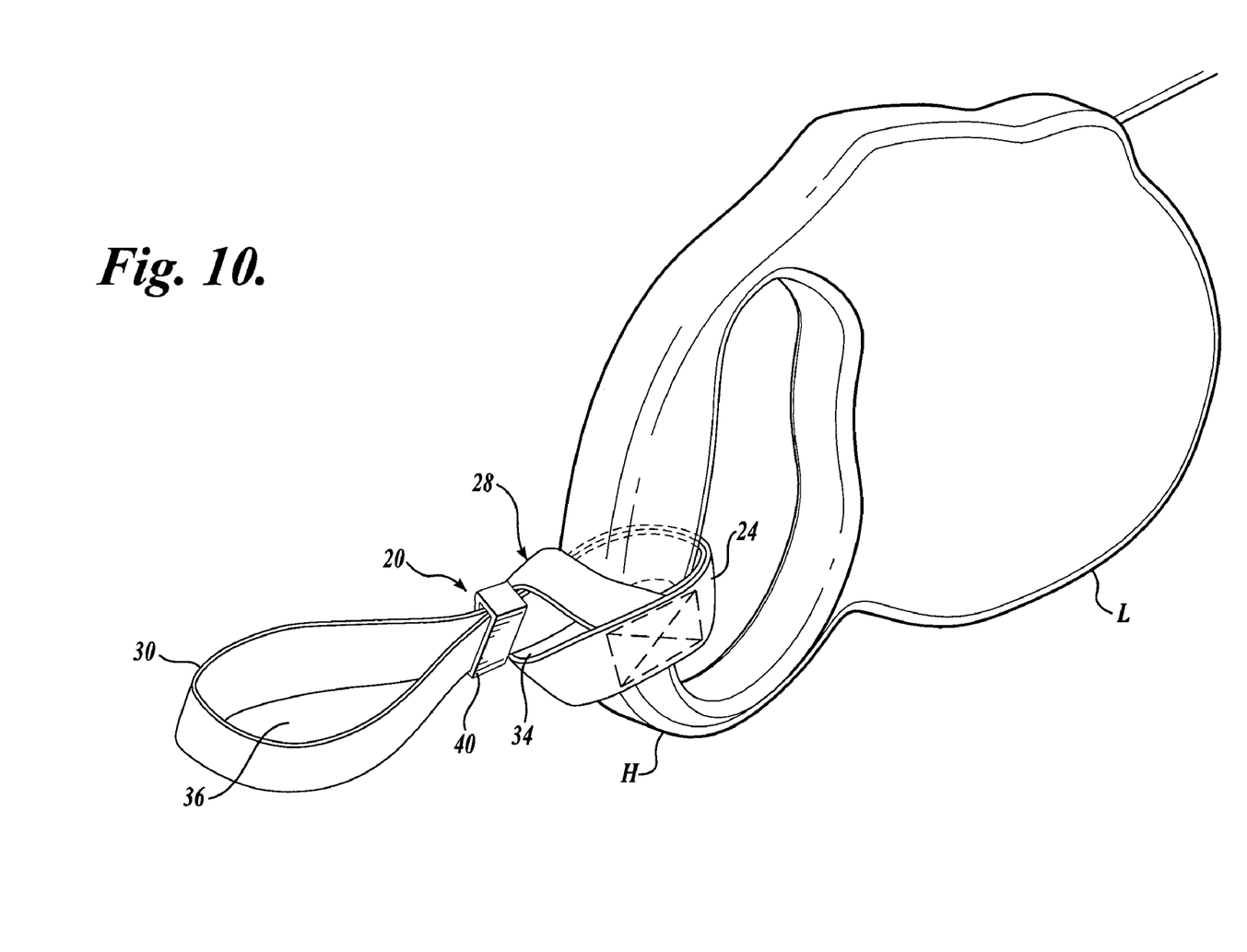

The operation of the coupling device 20 will now be described with reference to FIGS. 7-10. First, a coupling device 20 and a closed handled device L (See FIG. 1), such as a retractable dog leash, briefcase, luggage etc., are obtained. Next, the first loop 28 of the coupling device 20 is routed through the opening formed by the closed handle H of the device L, as best shown in FIG. 8. Then, the second loop 30 of the coupling device 20 is grasped and routed through the first opening 34 of the first loop 28, as shown best in FIG. 9. Thereafter, the second loop 30 is continued to be pulled through the first opening 28 and then pulled back in the opposite direction, as best shown in FIG. 10, thereby securing the coupling device 20 around the closed handle H. If the coupling device 20 is equipped with the size adjustment collar 40, the collar 40 should also pass through the first loop 28 prior to the second loop 30 being tightly secured to the handle H. Once the coupling device 20 is secured to the device L, the second loop 30 may then be slipped over the wrist of the user, and the collar 40 moved in a frictionally slidably manner toward the user's hand to tighten.

Figure 13:
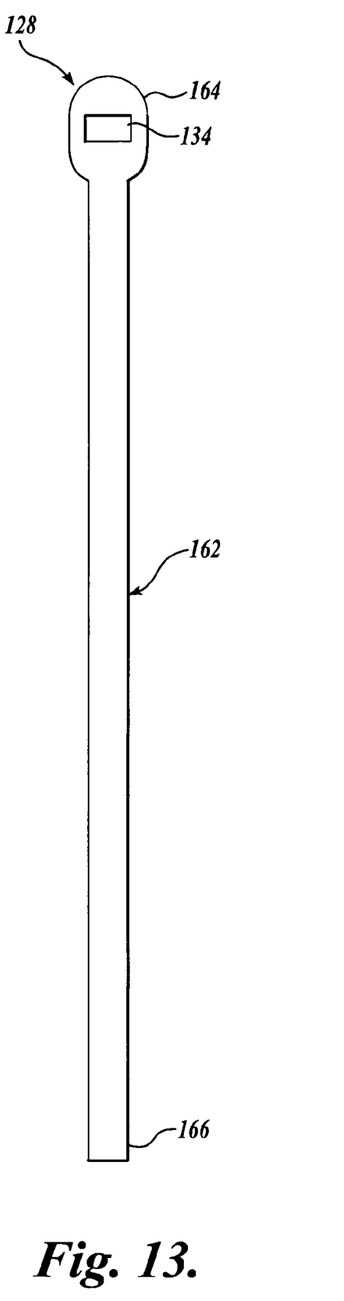
Figure 14:
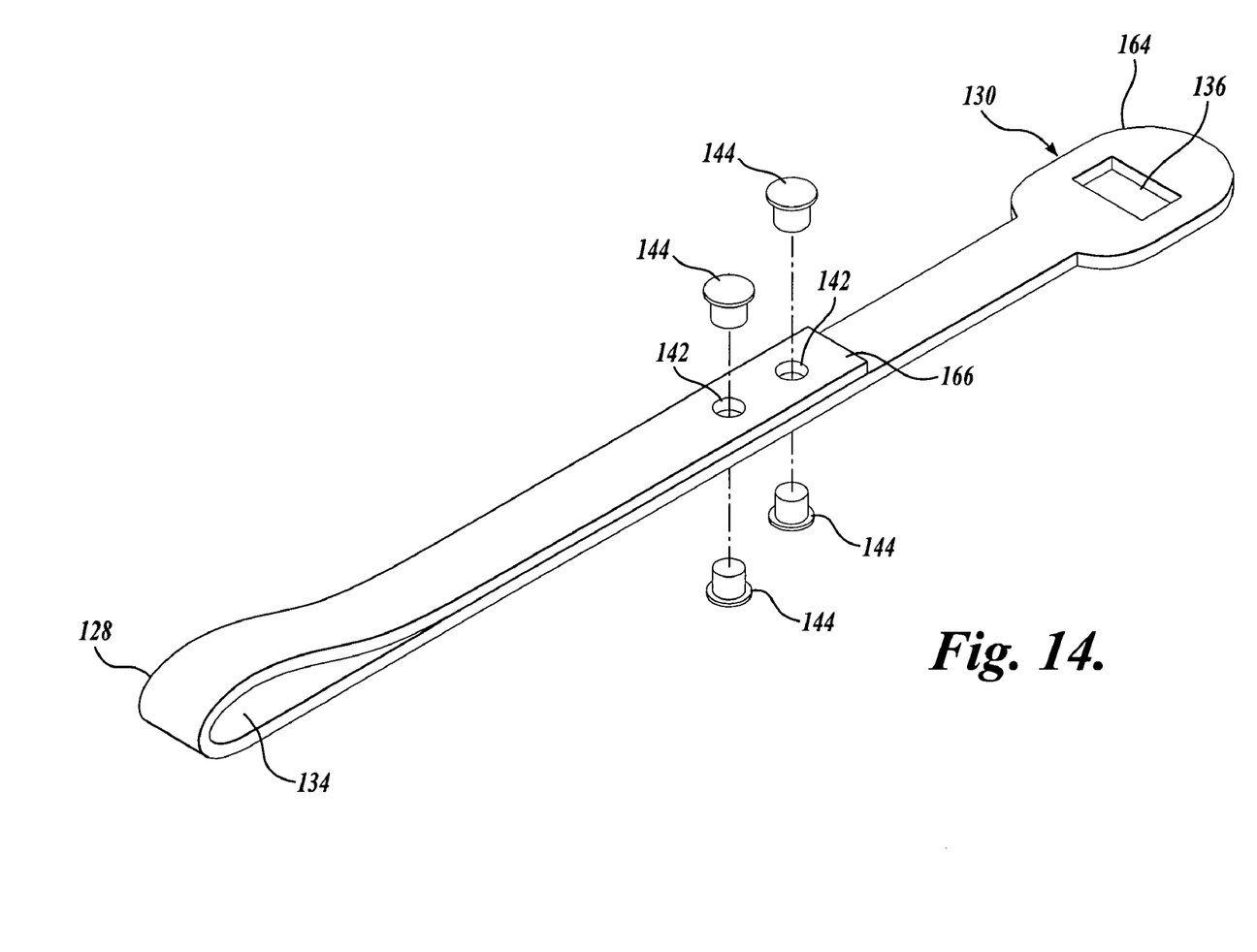
Figure 15:
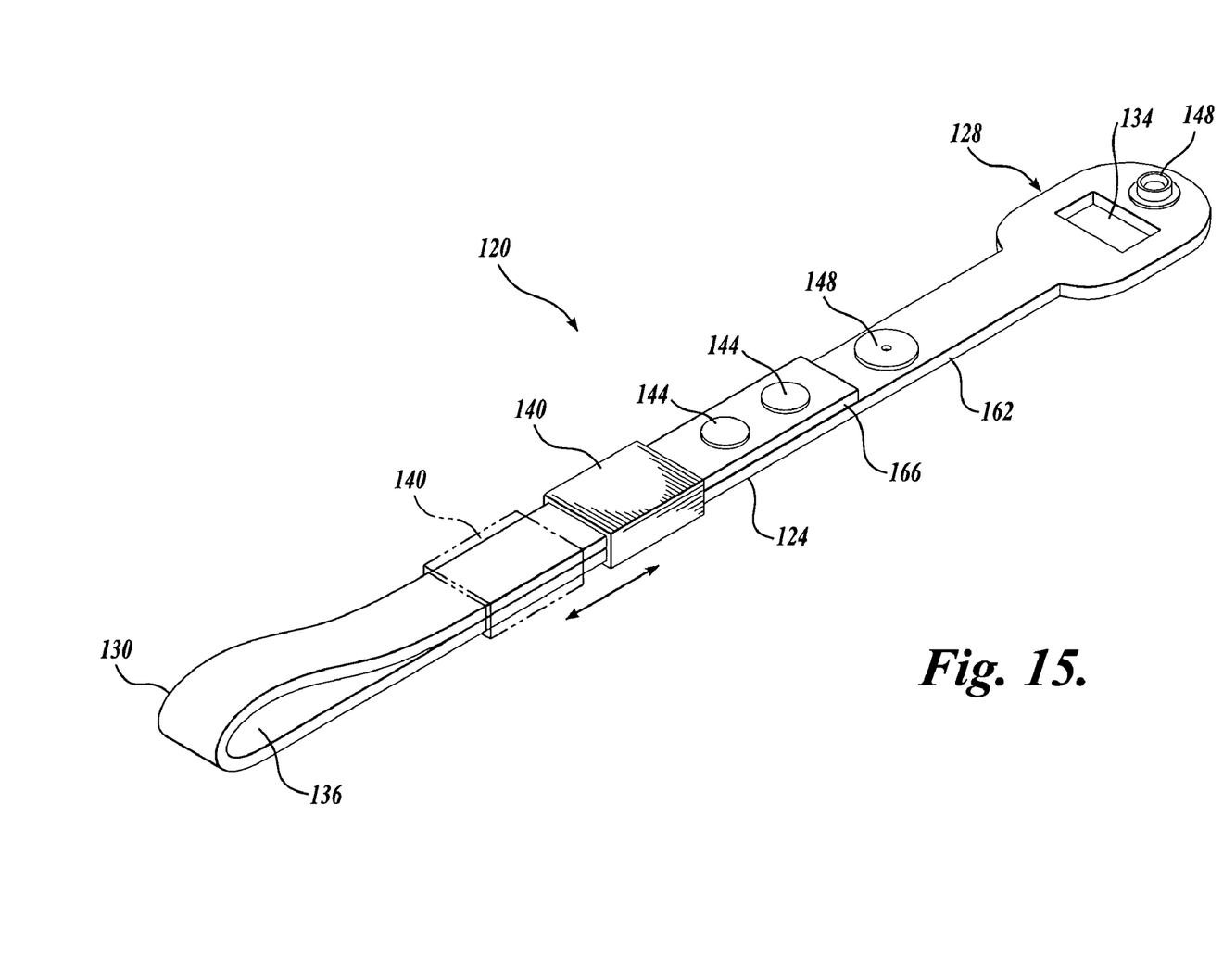

FIGS. 11-15 depict an alternative embodiment of a coupling device 120, constructed in accordance with the present invention. The coupling device 120 is substantially identical in materials, construction, and operation as the coupling device 20 of FIGS. 1-10, except for the differences that will be explained in detail below. For clarity in the ensuing description, numerical references of like elements of coupling device 20 will be used but will begin with the prefix "1xx". As best shown in FIG. 15, the coupling device 120 includes a body 124 constructed from a pliable material, such as leather. Formed at the ends of the body 124 are first and second loops 128 and 130 that define first and second openings 134 and 136, respectively. The first opening 134 is sized and configured such that the second loop 130 may be routed therethrough, and is preferably sized smaller than the second opening 136. The second opening 136 is sized and configured to slide over the hand and wrist of a user. When opened, the central axis of the first opening 134 is non-parallel with the central axis of the second opening 136. Preferably, the openings 134 and 136 are oriented such that the amount of body twisting is minimized during use.

The coupling device 120 may further include a size adjustment collar 140 that functions to adjust the size of the second opening 136. The collar 140 is slidably movable over the second loop 130 in a friction engaging manner. The collar 140 is preferably constructed of plastic or other rigid or semi-rigid materials. In operation, once the second loop 130 is slipped over the wrist of the user, the size adjustment collar 140 may be moved toward the wrist (i.e.; in the direction of the hand) until the size of the second opening 136 has decreased enough where the coupling device 120 is prevented from slipping off the wrist of the user. The coupling device 120 may further include mechanical fasteners, such as snap fasteners 148, hook and loop fasteners, etc., to further assist in securing the coupling device 120 to a closed handled device.

Figure 11:
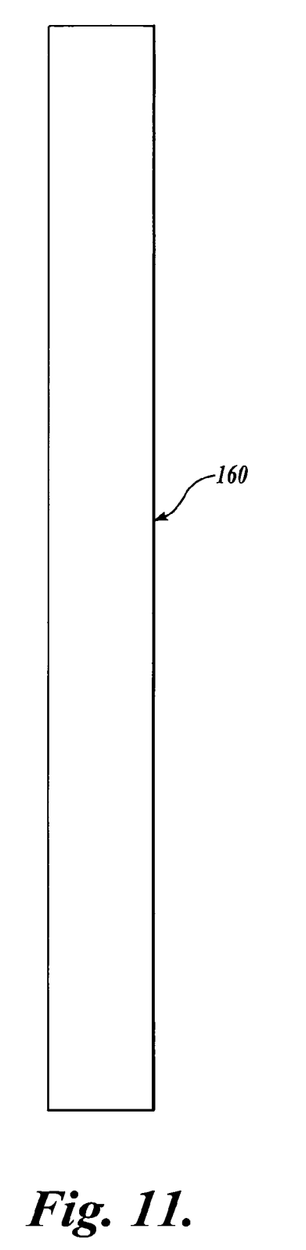
FIGS. 11-15 illustrate an alternative embodiment of the coupling device and the sequential steps of making the same.
Figure 12:
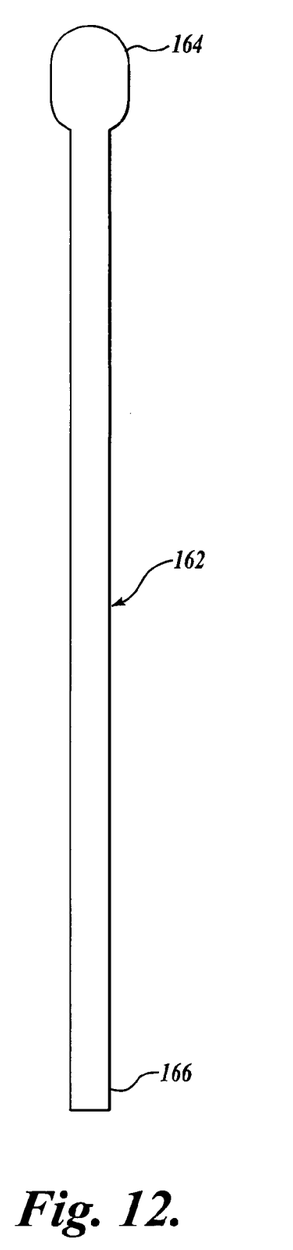

One method of constructing the coupling device 120 will now be described in detail with reference to FIGS. 11-15. As best shown in FIG. 11, the coupling device 120 begins with an elongated rectangular strip 160 of any suitable material discussed above, such as leather, of a sufficient dimension, for example, approximately 20 inches in length by approximately two inches in width by approximately one-sixteenth inch in thickness (20×2×1/16), although these dimensions may vary depending upon the application of the coupling device. Once the elongated rectangular strip 160 has been obtained, a band 162 is cut or otherwise formed therefrom, as best shown in FIG. 12, to include a bulbous first end 164 and a squared end 166. In one embodiment, the bulbous first end 164 is approximately two inches in length and one and one-half inches (1½) in width. Thereafter, an aperture is cut, punched, or otherwise formed in the bulbous first end 164, thereby forming the first opening 134, as best shown in FIG. 13. As such, by forming the bulbous first end 164 with the first opening 134, the first loop 128 is thereby formed. In one embodiment, the first opening 136 is approximately one-half inch (½) in length by approximately seven-eighths (⅞) of an inch in width.

Once the first loop 128 has been formed, the squared end 166 is bent toward the first loop 128, and placed against the remaining portion of the band 162, as best shown in FIG. 14. Once the squared end 166 is juxtaposed against the band 162 at a sufficient location (e.g. approximately 5-7 inches from the top edge of the first end 164) such that a sufficiently sized second opening 136 is formed, a plurality of holes 142 are cut, punched, or otherwise formed through the overlapped band sections for receiving mechanical fasteners 144, such as rivets or the like.

Once the mechanical fasteners are employed and the second loop 130 has been formed, the optional size adjustment collar 140 may be slid over the closed end of the second loop 130 to a position shown in FIG. 15. If the coupling device 120 is equipped with mechanical snap-type fasteners 148, a hole (not shown) may be punched, cut, or otherwise formed in the band 162 directly adjacent to the squared end 166 for receiving one component of the snap-type fastener system. A second hole may then be cut, punched, or otherwise formed directly adjacent the first opening 134 to receive the corresponding component of the snap-type fastener system. In operation, the snap fasteners 148 function to augment the securement of the coupling device 120 to the closed handle H of the device L.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of using a coupling device for providing redundant attachment between an arm of a user and a device having a closed handle, the method comprising:
    obtaining a coupling device having first and second ends, said coupling device comprising a strap having a first portion and a second portion and each portion having a first side surface and a second side surface, said first end including a first loop defining a first opening and said second end including a second loop defining a second opening, and wherein said first loop defining said first opening is formed by attaching a portion of said first side surface of said first portion to a portion of said second side surface of said first portion, such that said first loop is oriented in a substantially open position;
    routing either said first loop or said second loop through the closed handle;
    moving a distal tip of said second loop toward said first opening without twisting said coupling device more than 45 degrees from a longitudinal axis of said coupling device;
    inserting said second loop through said first opening without twisting said coupling device more than 45 degrees from the longitudinal axis of said coupling device; and
    pulling said second loop through said first opening to tighten said coupling device to said closed handled device without twisting said coupling device more than 45 degrees from the longitudinal axis of said coupling device.

2. The method of claim 1, further comprising sliding the second loop over a wrist of a user.

3. The method of claim 2, wherein the coupling device further comprises a size adjustment collar slidably coupled to said second loop.

4. The method of claim 3, further comprising sliding said size adjustment collar along said second loop in the direction of the user's wrist.

5. The device of claim 1, further comprising inserting said second loop through said first opening without twisting said coupling device more than 30 degrees from the longitudinal axis of said coupling device.

6. The device of claim 1, wherein said coupling device is formed from an elongate body having a length and a width and wherein said first opening of said first loop is sized to correspond with the width of the elongate body.

7. A method of using a coupling device for providing redundant attachment between an arm of a user and a device having a closed handle, the method comprising:
    obtaining a coupling device having first and second ends, said coupling device comprising a strap having a first portion and a second portion and each portion having a first side surface and a second side surface, said first end including a first loop defining a first opening and said second end including a second loop defining a second opening, and wherein said first loop defining said first opening is formed by attaching a portion of said first side surface of said first portion to a portion of said second side surface of said first portion, such that said first loop is oriented in a substantially open position, and the coupling device having a friction-engaging size adjustment collar slidably coupled to said second loop;
    routing either said first loop or said second loop through the closed handle;
    moving a distal tip of said second loop toward said first opening without twisting said coupling device more than 45 degrees from a longitudinal axis of said coupling device;
    inserting said second loop through said first opening without twisting said coupling device more than 45 degrees from the longitudinal axis of said coupling device;
    pulling said second loop through said first opening to tighten said coupling device to said closed handled device without twisting said coupling device more than 45 degrees from the longitudinal axis of said coupling device;
    sliding the second loop over a wrist of a user; and
    sliding said friction-engaging size adjustment collar along said second loop in the direction of the user's wrist.

8. The device of claim 7, further comprising inserting said second loop through said first opening without twisting said coupling device more than 30 degrees from the longitudinal axis of said coupling device.

9. The device of claim 7, wherein said coupling device is formed from an elongate body having a length and a width and wherein said first opening of said first loop is sized to correspond with the width of the elongate body.

10. A method of using a coupling device for providing redundant attachment between an arm of a user and a device having a closed handle, the method comprising:
    obtaining a coupling device having first and second ends, said coupling device comprising a strap having a first portion and a second portion and each portion having a first side surface and a second side surface, said first end including a first loop defining a first opening, wherein said first loop is oriented in a substantially open position, and said second end including a second loop defining a second, larger opening, and wherein said first loop defining said first opening is formed by attaching a portion of said first side surface to a portion of said second side surface of said first portion;
    routing either said first loop or said second loop through the closed handle;
    moving a distal tip of said second loop toward said first opening without substantially twisting said coupling device about a longitudinal axis of said coupling device;
    inserting said second loop through said first opening without substantially twisting said coupling device about the longitudinal axis of said coupling device; and
    pulling said second loop through said first opening to tighten said coupling device to said closed handled device without substantially twisting said coupling device about the longitudinal axis of said coupling device.

* * * * *

UNITED STATES PATENT AND TRADEMARK OFFICE
CERTIFICATE OF CORRECTION

PATENT NO. : 7,484,273 B1  Page 1 of 1
APPLICATION NO. : 10/733827
DATED : February 3, 2009
INVENTOR(S) : A. D. Dupree et al.

It is certified that error appears in the above-identified patent and that said Letters Patent is hereby corrected as shown below:

| COLUMN | LINE | |
|---|---|---|
| 6 | 47 | after "said first side surface" insert --of said first |
| (Claim 10, | line 13) | portion-- |

Signed and Sealed this

Nineteenth Day of May, 2009

JOHN DOLL
*Acting Director of the United States Patent and Trademark Office*